(12) United States Patent
Helfenstein et al.

(10) Patent No.: US 12,000,726 B2
(45) Date of Patent: Jun. 4, 2024

(54) METHOD FOR THE GRAVIMETRIC CONTROL OF A METERING DEVICE FOR A BULK MATERIAL DURING THE REFILLING OF ITS STORAGE CONTAINER, AND METERING DEVICE FOR CARRYING OUT THE METHOD

(71) Applicant: K-TRON Technologies, Inc., Sewell, NJ (US)

(72) Inventors: Urs Helfenstein, Buchs (CH); Stefan Ludescher, Stüsslingen (CH)

(73) Assignee: K-TRON TECHNOLOGIES, INC., Sewell, NJ (US)

( * ) Notice: Subject to any disclaimer, the term of this patent is extended or adjusted under 35 U.S.C. 154(b) by 476 days.

(21) Appl. No.: 17/190,591

(22) PCT Filed: Sep. 6, 2019

(86) PCT No.: PCT/IB2019/057521
§ 371 (c)(1),
(2) Date: Mar. 3, 2021

(87) PCT Pub. No.: WO2020/049513
PCT Pub. Date: Mar. 12, 2020

(65) Prior Publication Data
US 2021/0364340 A1    Nov. 25, 2021

(30) Foreign Application Priority Data

Sep. 7, 2018  (CH) .................................. 1064/18
Dec. 19, 2018 (CH) .................................. 1566/18
Dec. 28, 2018 (CH) .................................. 1612/18

(51) Int. Cl.
*G01G 13/24*    (2006.01)
*G01F 1/88*     (2006.01)
(Continued)

(52) U.S. Cl.
CPC ............. *G01G 13/248* (2013.01); *G01F 1/88* (2013.01); *G01G 11/08* (2013.01); *G01G 13/28* (2013.01); *G01G 23/01* (2013.01); *G05D 7/0605* (2013.01)

(58) Field of Classification Search
CPC ...... G01G 13/248; G01G 11/08; G01G 13/28; G01G 23/01; G01F 1/88; G05D 7/0605
See application file for complete search history.

(56) References Cited

U.S. PATENT DOCUMENTS 3,164,217 A * 1/1965 Peirce .................... G01G 13/00
                                                     177/71
3,659,665 A * 5/1972 Godwin ............... G01G 3/1406
                                                      177/1
4,529,050 A * 7/1985 Mosher ................ G01G 19/393
                                                      177/1

(Continued)

FOREIGN PATENT DOCUMENTS

JP    H10-279957 A    10/1998
JP    2004-301560 A   10/2004
(Continued)

*Primary Examiner* — Paul R Durand
*Assistant Examiner* — Michael J. Melaragno
(74) *Attorney, Agent, or Firm* — Dinsmore & Shohl LLP (57) ABSTRACT

The method according to the invention provides a way to continue gravimetric weighing of bulk material during refilling of a gravimetric metered dispensing unit, and to determine the mass of the refilled bulk material using a refilling container during the filling operation material and so determine the actual mass flow discharged during refilling in real time or on average in order to adjust it to a target mass flow.

20 Claims, 6 Drawing Sheets

(51) Int. Cl.
*G01G 11/08* (2006.01)
*G01G 13/28* (2006.01)
*G01G 23/01* (2006.01)
*G05D 7/06* (2006.01)

(56) References Cited

U.S. PATENT DOCUMENTS

| | | | | |
|---|---|---|---|---|
| 5,042,539 A * | 8/1991 | McGregor | ........... | B65G 65/463 |
| | | | | 222/196 |
| 5,196,050 A * | 3/1993 | Taniyoshi | ................ | F27B 1/20 |
| | | | | 75/387 |
| 5,423,456 A * | 6/1995 | Arendonk | ............ | G01G 13/026 |
| | | | | 222/54 |
| 5,450,984 A * | 9/1995 | Rohr | ...................... | G01G 13/28 |
| | | | | 222/64 |
| 5,730,153 A * | 3/1998 | Chang | .................... | A61B 46/00 |
| | | | | 128/857 |
| 6,155,767 A * | 12/2000 | Walker | ............... | G01G 23/3728 |
| | | | | 177/163 |
| 7,677,864 B2 * | 3/2010 | Baer | .................. | B65G 65/4881 |
| | | | | 415/126 |
| 8,200,367 B2 * | 6/2012 | Foley | ................... | G01G 13/003 |
| | | | | 700/240 |
| 8,397,954 B2 * | 3/2013 | Lehmann | ................ | B01F 35/30 |
| | | | | 222/236 |
| 2004/0060367 A1 * | 4/2004 | Bergman | ................. | B65B 1/32 |
| | | | | 73/861.41 |
| 2010/0269954 A1 * | 10/2010 | Kaszkin | ................. | G01G 11/086 |
| | | | | 141/83 |
| 2021/0364340 A1 * | 11/2021 | Helfenstein | ............... | G01F 1/88 |

FOREIGN PATENT DOCUMENTS

| | | |
|---|---|---|
| JP | 2005-327118 A | 11/2005 |
| WO | 2016150923 A2 | 9/2016 |
| WO | WO-2020049513 A2 * | 3/2020 ............... G01F 1/34 |

* cited by examiner

METHOD FOR THE GRAVIMETRIC CONTROL OF A METERING DEVICE FOR A BULK MATERIAL DURING THE REFILLING OF ITS STORAGE CONTAINER, AND METERING DEVICE FOR CARRYING OUT THE METHOD

The present invention relates to a method for controlling the mass flow of a metered dispensing unit for bulk materials according to the preamble of claim 1 and a metered dispensing unit for carrying out said method according to the preamble of claim 12.

The gravimetric metered dispensing units are also known as loss-in-weight load cells and are used widely and in many branches of industry for all possible flowable materials, i.e. bulk materials, as long as much materials are able to pass through a gravimetric metered dispensing unit. The free flowing materials are poured into a storage hopper and then discharged from it in metered quantities via an output conveyor. The metered dispensing unit is positioned on a load cell, so that the weight registered by the load cell is the gross weight, i.e. the known and constant weight of the components of the metered dispensing unit (tare) plus the variable weight of the bulk material currently present in the storage hopper (net weight).

In this way, the load cell registers the reduction in weight of the entire metered dispensing unit continuously while the metered dispensing unit is operating, and consequently due to the constant weight of the metered dispensing unit also the reduction of weight in the storage hopper, so that a controller of the metered dispensing unit is able to determine the actual discharged mass flow of the free flowing material from the weight reduction and control the output conveyor appropriately in comparison with a predetermined target mass flow to minimise the difference between the actual mass flow and the target mass flow.

At the same time, it may be necessary to control the discharged mass flow extremely precisely, in the pharmacy sector for example, or when colour pigments are to be mixed together in industrial manufacturing. Furthermore, the target mass flow may be very small, for example in the case of the aforementioned colour pigments and in the manufacture of medications, or large, as may be the case in plastics production and mining, for example.

If the mass flow discharged from the metered dispensing unit is to continue without interruption, the storage hopper must be replenished periodically while the metered dispensing operation is ongoing. A refilling station then fills the hopper with bulk material as soon as a predetermined lower fill level is detected in it by gravimetric means (i.e. via the reduction in weight in the storage hopper), and stops the refilling operation as soon as the storage hopper has reached its filling weight or the metered quantity has been discharged into the storage hopper, as indicated by a fill level in the refilling container. The refilling station is typically located above the storage hopper, so that a slider or a valve of some other design in the line between the storage hopper and the refilling station can be opened and closed again for the refilling.

During the refilling, the gravimetric controller is blind, because the load cell no longer registers a loss of weight corresponding to the actual discharged mass flow, but instead a weight increase characterized by significant disturbances. Depending on the dynamic behaviour of the load cell used, these disturbances persist for a shorter or longer period after the end of the refilling operation, with the result that the gravimetric metered dispensing can only be resumed when the load cell has regained a resting state after the filling operation has ended. The blind period can last from about 5 seconds up to 5 minutes, depending on the nature of the bulk material, the target mass flow and the metered dispensing unit and refilling station used.

Since there is no way possible in the related art to dispense metered quantities gravimetrically during refilling, a volumetric controller is used, i.e. the output conveyor is controlled via the volume of the bulk material it conveys, although it is then in the nature of things that the density or compaction of the bulk material is not accounted for. Taking the example of the widely used screw conveyor, this means that the control of the screw speed is adjusted according to the volume of the target mass flow, that is to say according to the volume between the windings of the screw (volumetric delivery) and no longer according to the reduction in weight of the storage hopper (gravimetric delivery). A disadvantage of volumetric delivery is that unlike gravimetric control it is not possible to capture the fluid-dynamic behaviour of the bulk material displaced by refilling and metered dispensing, i.e. the volumetrically controlled mass flow of bulk material is fundamentally uncontrollable with the exception of the unsophisticated control of the screw conveyor speed or the working speed of the output conveyor. However, the behaviour of the shifted bulk material has a decisive effect on the volumetrically created mass flow: for example, as mentioned earlier various are compacted heavily under pressure (others less so), with the result that their mass per unit volume depends on the fill level of the storage hopper, which in turn results in a different mass flow depending on fill level in the case of volumetric delivery.

On page 2 in the brochure "K-Tron Smart Refill Technology" from 2009, FIG. 3 "Dynamics of the refill operation" shows a volumetric control model for the output conveyor which takes into account the compaction of the bulk materials at the bottom in the area of the screw conveyor, which is derived from the height of the material column, i.e. the fill level of the storage hopper. During gravimetric delivery, the gravimetric controller reduces the screw speed at a high fill level (i.e. compacted bulk material) and then increases the speed again as the fill level falls (i.e. less compaction). In this way, a screw speed can be assigned to each fill level while the storage hopper is being emptied. For refilling, if a refilling station discharges a large quantity of powder rapidly into the storage hopper, a suitable curve for the rise in the fill level (typically a straight line) is then assumed and each screw speed detected during emptying of the storage hopper is assigned to this fill level curve, so that the screw speed falls correspondingly during refilling until the storage hopper has been filled. The error during volumetric delivery is correspondingly reduced in respect of a constant screw speed, but not completely eliminated since the real conditions in the storage hopper during refilling are still unknown.

FIG. 4 "Refill Frequency" on page 4 of the same brochure suggests increasing the refilling frequency to as many as 60 refills per hour. The effect of this is to shorten the individual refill times, i.e. the metered dispensing error during operation with the volumetric control model cannot become as large. It may be assumed that the total refilling time per hour remains constant regardless of the refill frequency. However, the fact is that the difference between target and actual increases progressively in a prolonged refill operation, that is to say the metered dispensing error becomes progressively more serious. For most applications, then, more frequent but small metered dispensing errors are tolerable because they remain within the specification, whereas less frequent but large metered dispensing errors lead to values that are not within specification and are therefore unacceptable. The volumetric control model which takes into account compaction on the basis of data from the preceding storage hopper emptying cycle in conjunction with a high refill frequency enables relatively good metered quantity dispensing during refilling for certain applications. However, the drawback of the control model which takes compaction into account is that significant metered dispensing errors still occur during refilling, i.e. metered dispensing errors that are larger than those which occur during gravimetric delivery. A particular drawback in this context is that the metered dispensing error itself is still unknown, although its size can be reduced using a volumetric control model with greater refill frequency. The mere existence of an unquantified metered dispensing error can lead to a quality problem, in pharmaceuticals for instance, or also when mixing colours (see above), even though a dispensing error in and of itself might be permissible.

It is suggested on WO 2013/182869 page 7 to store data during refilling, to discharge the same quantity of powder into the storage hopper during each refilling operation, and to operate the output conveyor on the basis of the data saved during a preceding refilling operation. In this context, it is reported that because of the identical refilling conditions it is possible the collect data at the outlet from the metered dispensing unit and control the speed of the output conveyor accordingly. However, there is no suggestion as to what such data might be, nor is there a description of how data can be collected at outlet from the metered dispensing unit in the first place. Besides, the principle of gravimetric metered dispensing overcomes precisely the problem of the considerable difficulty of measuring a throughput rate in kg/h in a discharged bulk material flow—this would also mean that an additional measuring station would have to be provided behind the metered dispensing unit. Furthermore, it is still unclear how a control model for the subsequent refilling would have to be designed if it were indeed possible to collect data at the outlet of the metered dispensing unit.

Accordingly, it is the object of the present invention to provide a metered dispensing unit for bulk materials which enables a determination of the metered dispensing error during refilling.

This object is solved with a method having the features of claim 1 or with a metered dispensing unit having the features of claim 14.

Since the weight of the bulk material discharged during refilling of the storage hopper is captured in the refilling station, it can be determined independently of the disturbances that occur in the metered dispensing unit during refilling. Since the increase in weight of the bulk material in the storage hopper during refilling has been determined, it is possible to calculate the actual mass flow of the weight of the bulk material that has passed via the output conveyor from the difference with regard to the weight of the refilling bulk material. Since this only requires measurement of the increase in weight of the bulk material in the storage hopper, suitable compensation as described below can be made for the substantial disturbances associated with this measurement which occur during refilling.

In a further embodiment of the present invention according to claims 2 and 15, surpassing the limits of the stated object, a metered dispensing unit for bulk materials is provided which further allows control of the actual discharge mass flow while the hopper is being refilled. Thus, a metered dispensing unit is provided with a controller for the quantity of discharged bulk material even during the refilling phase, wherein optionally the metered dispensing error (minimised by the controller) may also be output as well as the control.

Further preferred embodiments include the features of the dependent claims.

In the following text, the invention will be explained in somewhat greater detail with reference to the drawing.

Figure 1:
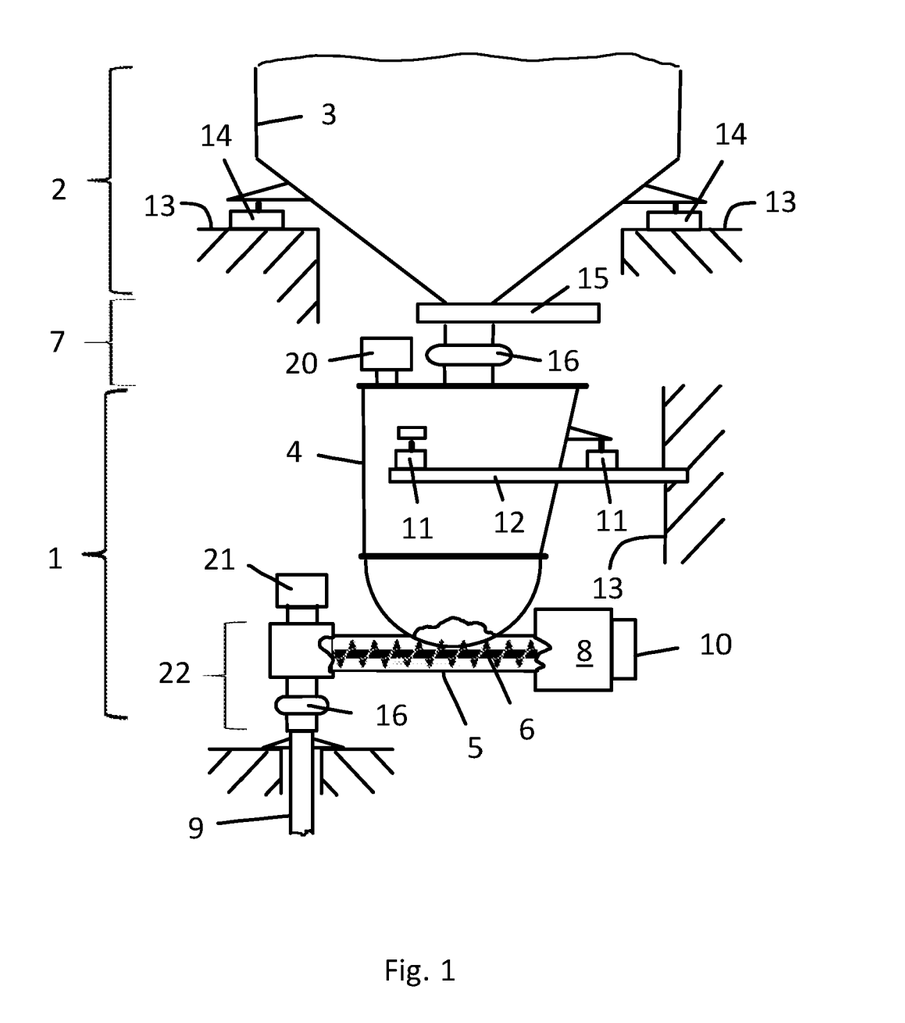
FIG. 1 shows a schematic representation of a metered dispensing unit according to the invention.

FIG. 1 shows a schematic representation of a metered dispensing unit 1 according to the invention with a refilling station 2 which includes a refilling container 3 for the bulk material which is to be transported and dispensed in metered quantities. The metered dispensing unit 1 has a storage hopper 4 for the bulk material, and an output conveyor—embodied here as a screw conveyor—for the bulk material. The conveyor is shown in a cutaway view here, so that a conveying screw 6 is visible. It should be noted at this point that other output conveyors such as disc conveyors or vibration conveyors also fall within the scope of the invention.

Bulk material can be replenished via a connecting duct 7 between the refilling container 3 and the storage hopper 4, and is then discharged as an evenly metered mass flow via a discharge outlet 9 by the screw conveyor 6 which is driven by a motor 8. For this purpose, motor 8 is controlled by means of a controller 10. This controller does not necessarily have to be arranged on the metered dispensing unit 1, it may be located anywhere in the production line, e.g., with the line controller. The data lines required for operating the controller that pass between the controller and the associated components of the metered dispensing unit 1 and the refilling station 2 have been omitted to remove unnecessary details from the figure.

The metered dispensing unit 1 is based on a plurality of gravimetric (i.e. designed for metered quantity dispensing by gravimetry) load cell 11 (although it is also possible to provide only one gravimetric load cell), which are arranged along a support beam 12 on a frame 13 of the production line. In the embodiment shown here, according to the invention the refilling container 3 is also based on refill load cells 14, which are arranged on the frame 13. In the embodiment represented, the connecting duct 7 is equipped with a slider 15 which can be opened for refilling the storage hopper 4 and remains closed while the hopper is being emptied. Other closing elements such as a rotary valve may also be provided. A bellows 16 is also provided, which mechanically decouples the storage hopper 4 (and therewith also the metered dispensing unit 1) from the refilling station 2, so that the gravimetric load cells 11 only detect the weight of the metered dispensing unit 1. Such a bellows 16 is also provided in front of the line 9 which transports the evenly dispensed mass flow of the bulk material onwards.

The structure of this arrangement described above is known in principle to the person skilled in the art, as are the two operating modes in which it functions: firstly the gravimetric operating mode, in which the storage hopper is emptied and the loss of weight by the metered dispensing unit 1 corresponds to the actual mass flow of the bulk material (since the weight of the metered dispensing unit 1 itself is constant), wherein a gravimetric control model in the controller 10 regulates the delivery output of the screw conveyor 6 with respect to the target mass flow. Then the volumetric operating mode, in which the storage hopper is refilled with gravimetric control blind. A volumetric control model then takes over from the closed loop control, and as described above is preferably based on the feedback control data during gravimetric operation, although, as mentioned previously, the uncontrollable actual mass flow exhibits larger deviations from the target mass flow during refilling than is the case in gravimetric mode.

FIG. 1 further shows a pressure sensor 20 for the internal pressure prevailing in storage hopper 4. During refilling of the storage hopper, which takes place more or less all at once, the air pressure therein increases correspondingly. If the gravimetric operation is resumed after refilling, in a closed system in which the storage hopper 4 is not open to the outside environment the pressure briefly remains elevated. This is often also the case when an overpressure channel is provided between the storage hopper 4 and the refilling container 3, since such a channel (or the lines upstream of the channel) are often not capable of performing the function of an expansion vessel. This means that when switch from volumetric to gravimetric mode the weight registered by the gravimetric load cells 11 is still greater than the value corresponding to the bulk material present in the storage hopper 4. The reason for this is that the slider 15 of the refilling station 2 is suspended (necessarily) on the frame 13 above the refilling container 3, with the result that the product of the cross-sectional area of the connecting duct 7 and the currently prevailing overpressure returns an additional distorting force on the gravimetric load cell 11. The person skilled in the art is aware that an elevated air pressure in the storage hopper 3 must be detected via pressure sensor 20 at the start of gravimetric mode and to this extent an incorrect gravimetric dosing avoided.

A pressure sensor 21 is also shown in the discharge outlet 22, by means of which pressure fluctuations in the discharge outlet are captured and may be processed by the controller 10 in similar manner to the pressure fluctuations in the storage hopper 4.

The Applicant has found that further disturbances occur during refilling, in addition to the pressure fluctuations in the storage hopper 4, and these affect the discharged mass flow adversely during refilling:

These further disturbances include for example the momentum of the bulk material falling from the height of the refilling container 3 onto the bottom of the storage hopper 4, wherein this disturbance may be of various kinds. Firstly, the momentum generates a force on the storage hopper 4, which may be detected as weight by the gravimetric load cells (weight through momentum), with the result that the controller 10 detects an inaccurate bulk material mass in the storage hopper 4. Secondly, the momentum causes the bulk material located below the bulk material falling onto it to be compacted further, i.e. more than the compaction corresponding to the fill level (compaction through momentum). Thirdly, the bulk material may be driven through the rotating screw (or through a differently constructed output conveyor) a greater rate in the transport direction by the momentum (increased transport rate through momentum). Conversely, it may also happen that the bulk material develops turbulence as it falls into the storage hopper 4, which causes the momentum to change and the bulk material in the storage hopper 4 to be fluidised (reduced delivery rate through fluidisation). Finally, a short-duration bridge formation of the bulk material may occur while the refilling operation is still ongoing, both in the storage hopper 4 and in the refilling container 3, thereby influencing the refill quantity, first as the bridges are formed and then when they collapse (altered delivery rate through incorrect material flow).

Depending on the material, all these disturbances occur during a refilling phase or throughout the entire refilling period, they may be of equal or varying strength, they may occur alone or in combination, in which case they may reinforce or partially cancel each other out intermittently. The ambient conditions may affect these disturbances, for example the temperature, the air pressure or atmospheric humidity, with the result that for example a further drift of the metered mass flow of bulk material occurs at different times of the day.

In this context, the inventive embodiment in FIG. 1 is shown to be equipped with sensors for a parameter for the discharged refilling mass of refilling station 2 embodied as load cells 14. The refilling container 3 bears on the refilling load cells 14. These cells not only enable a determination to be made of the total weight of the bulk material discharged into the storage hopper 4 for a refill operation, they also function to determine the mass flow of the bulk material during the refilling operation itself. The Applicant has found that disturbances which occur in the storage hopper 4 can be captured during refilling and eliminated or at least significantly reduced computationally if the bulk material weight discharged from the refilling container 3, not the bulk material weight discharged into the storage hopper 4 is captured during the refilling operation, as described in more detail later in this document.

The result is a gravimetric metered dispensing unit according to the invention having a storage hopper for the bulk material that is to be dispensed in metered quantities and a refilling station connected thereto which is designed to replenish the bulk material in the storage hopper with a refill quantity and is equipped with a sensor for a parameter for the refill quantity, having at least one load cell which is operatively connected to the storage hopper and an output conveyor for the bulk material for gravimetric metered dispensing of the bulk material, and having a controller for the output conveyor which is designed to actuate said conveyor during a refilling phase according to a volumetric control model, wherein the controller is further designed to determine the weight of the bulk material discharged from the refilling station during the refilling from the signals of the sensor associated with the refill quantity, and to determine a value for the weight of the bulk material currently present in the storage hopper from the weight signal from the at least one gravimetric load cell, and to calculate an actual bulk material flow therefrom. In a further embodiment according to the invention, the controller is designed to determine a correction factor for the volumetric control model from the difference between a target bulk material flow and the actual bulk material flow and to apply this factor to the control model.

Figure 2A:
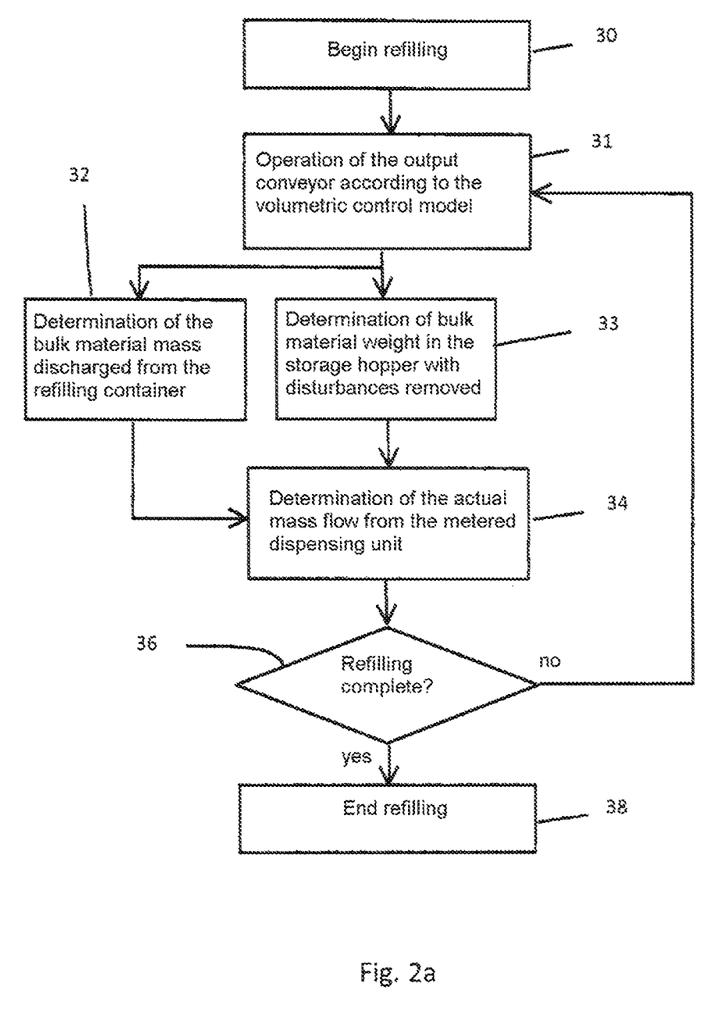
FIG. 2a shows a flowchart for determining the dispensing error in the mass flow discharged from the metered dispensing unit of FIG. 1 during refilling.

FIG. 2a shows a flowchart for determining according to the invention the dispensing error in the mass flow discharged from the metered dispensing unit 1 (FIG. 1) during refilling of its storage hopper 4.

In step 30, refilling is initiated by the controller 10, for example when the weight signal from the load cells 11 corresponds to a lower fill level of the storage hopper 4. This causes the controller 10 in step 31 to switch to the volumetric control model described previously which is stored in the controller and open the valve in the refilling duct 7, embodied here as a slider 15, so that a replenishment mass flow of bulk material flows into the refilling container. The refill load cells 14 correspondingly register a reduction of the weight of the refilling container 3, from which in step 32 the controller 10 determines the mass of bulk material that has been discharged into the storage hopper 4.

According to the invention, the controller 10 then processes the weight signals of the gravimetric load cells 11 further, although these signals are significantly distorted due to the disturbances which occur during refilling, that is to say they no longer accurately reflect the bulk material that is present in the storage hopper 4. Accordingly, in step 33 the mass bulk material present in the storage hopper 4 must be determined after compensating for disturbances (on this subject, refer also to the description of FIG. 3). If the (true or approximately true) weight of the bulk material present in the storage hopper 4 and the weight of the refilling bulk material is known (from the load cells 11 and 14) at any given time, the difference between these weights (compared with these weights from an earlier point in time) corresponds to the bulk material weight discharged via the output conveyor. In step 34, the discharge over time returns the refill mass flow, the change in the mass of the bulk material in the storage hopper 4, and the actual mass flow of bulk material discharged by the metered dispensing unit 1.

The data for the actual mass flow of bulk material may be stored in a data memory of the controller or output in real time to the line controller or to another element in which the data for the ongoing metered dispensing are processed further. This data ensures unbroken traceability of the metered dispensing with no "blind spots" during refilling which, as explained earlier, may be of critical importance particularly in highly sensitive production (such as pharmaceuticals or other applications as well).

At this point, it should be noted that in the simplest configuration, the volumetric control model contains nothing more than a predetermined value for the target mass flow, and therewith also a simple, constant regulating variable for the motor 8 (and the drive unit for a differently constructed output conveyor) so that it controls the mass flow generated by the output conveyor by means of a predetermined value for a target mass flow. However, it may also include for example a regulating variable which changes in predetermined manner over the refilling period, for example during a preceding gravimetric emptying operation (or according to another suitable principle), as described previously. Then, it also controls the mass flow generated by the output conveyor on the basis of data on the compaction of the bulk material while the storage hopper is being emptied.

In step 36, the controller 10 then uses the actual mass flow to generate a current correction factor for the volumetric control model and thus also for the regulating variable, so that the actual mass flow at least approximates or is substantially equal to the target mass flow. In step 36 the controller 10 uses for example the mass of refilling bulk material (load cells 14) or the bulk material weight adjusted to compensate for disturbances (load cells 11) to check whether the storage hopper contains the target refill quantity of bulk material, and if this is true it terminates the refilling operation in step 37, i.e. switches to gravimetric mode, or if it is not true, it returns to step 31 to continue the refilling operation.

As a result, a system is provided according to the invention for the gravimetric determination of the mass flow that is discharged during refilling from the metered dispensing unit 1, wherein the metered dispensing unit includes a storage hopper and a refilling station connected therewith which is designed for gravimetric metered dispensing via an output conveyor, the refilling container periodically replenishes the storage hopper with bulk material from a lower fill level state to a filled state, and is equipped with a sensor for a parameter associated with the discharged refill quantity, the output conveyor is actuated by a volumetric control model during refilling, and wherein the weight of the bulk material added to the storage hopper during refilling thereof is determined from the data of the sensor for the refill quantity discharged from the refilling station and the increase in the bulk material weight in the storage hopper that has taken place during refilling of the storage hopper is determined, and the actual flow of bulk material discharged during refilling is calculated from the difference between these two weights.

Figure 2B:
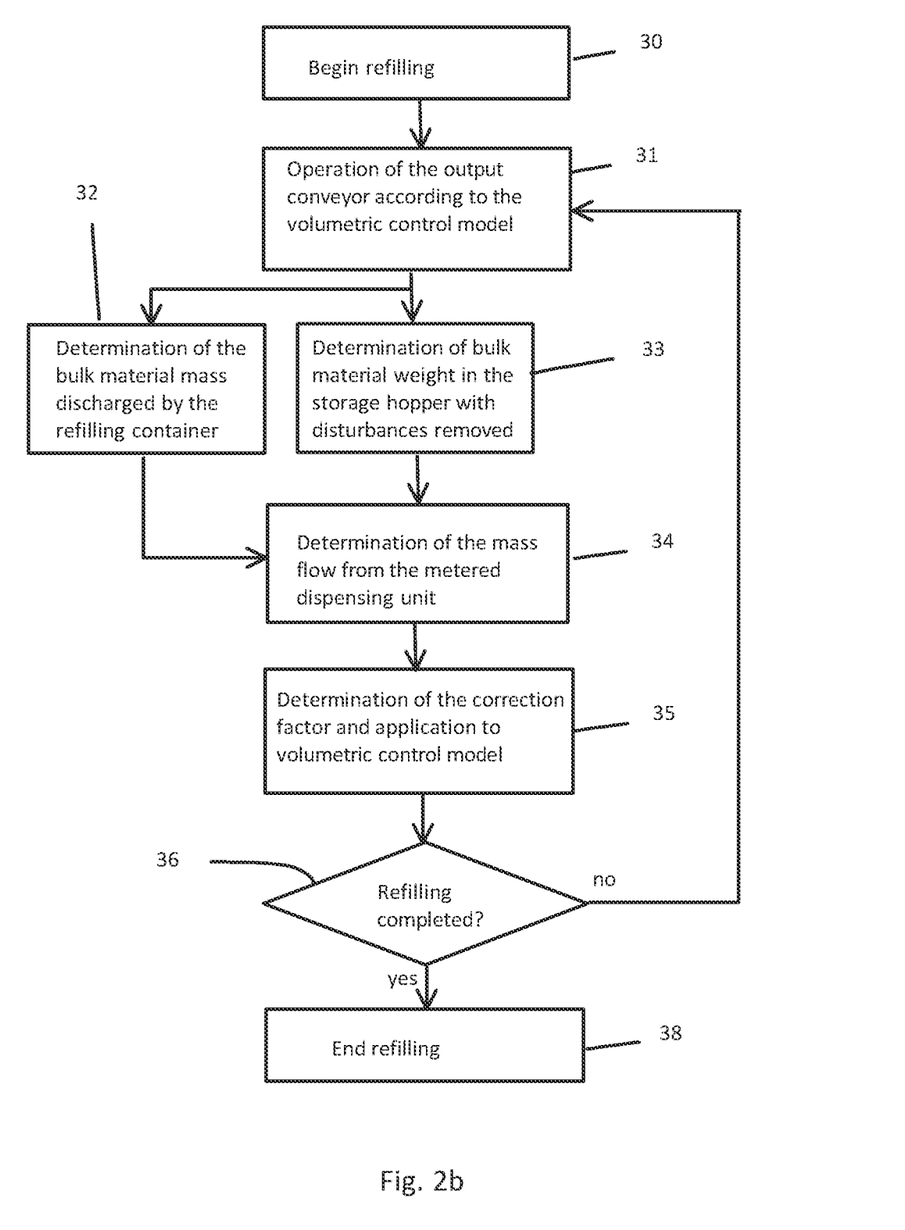
FIG. 2b shows a flowchart for controlling the mass flow discharged from the metered dispensing unit of FIG. 1 during refilling.

FIG. 2b shows a flowchart for a further embodiment of the invention, for regulating the mass flow discharged from the metered dispensing unit of FIG. 1 during refilling, this regulation being based on the determination of the actual bulk material flow according to the flowchart of FIG. 2a.

In step 35, the controller 10 then additionally generates a current correction factor for the volumetric control model based on the actual mass flow according to step 34 (see also FIG. 2a in this regard) and thus also for the regulating variable in such manner that the actual mass flow at least comes close to the value of the target mass flow if it is not substantially equal to it.

In this way and preferably, a correction factor for the volumetric control model is generated from the difference between a target bulk material flow and the actual bulk material flow, which correction factor is applied to the volumetric control model for regulating the mass flow further. In this situation of course it is particularly advantageous if the data for the actual bulk material flow or the actual mass flow still remains available to allow traceability of the dispensing during refilling but at the same time the (now quantifiable and traceable) metered dispensing error itself is minimised while refilling is in progress.

The flowchart according to FIG. 2a or 2b is preferably cycled through at least once, preferably several times during refilling, so that the actual bulk material flow is determined repeatedly and/or the correction factor is generated repeatedly and may then be applied to the volumetric control model in real time. The person skilled in the art is able to determine the cycle time for this pass according to the specific application, and thus fine tune the accuracy of the control during refilling, which may also be adapted to the properties of the material to be dispensed, among other possibilities. Accordingly, the gravimetric metered dispensing unit is preferably designed to determine actual bulk material flow (flowchart according to FIG. 2a) and/or the correction factor (flowchart according to FIG. 2b) repeatedly, wherein the correction factor is recalculated each time, and to apply it to the volumetric control model in real time during refilling in such manner that the value thereof is adapted for the target bulk material flow as refilling progresses. Of course, as mentioned earlier, even in the case of a bulk material flow which is regulated during refilling the metered dispensing error can be captured quantitatively and output at the same time.

Figure 3:
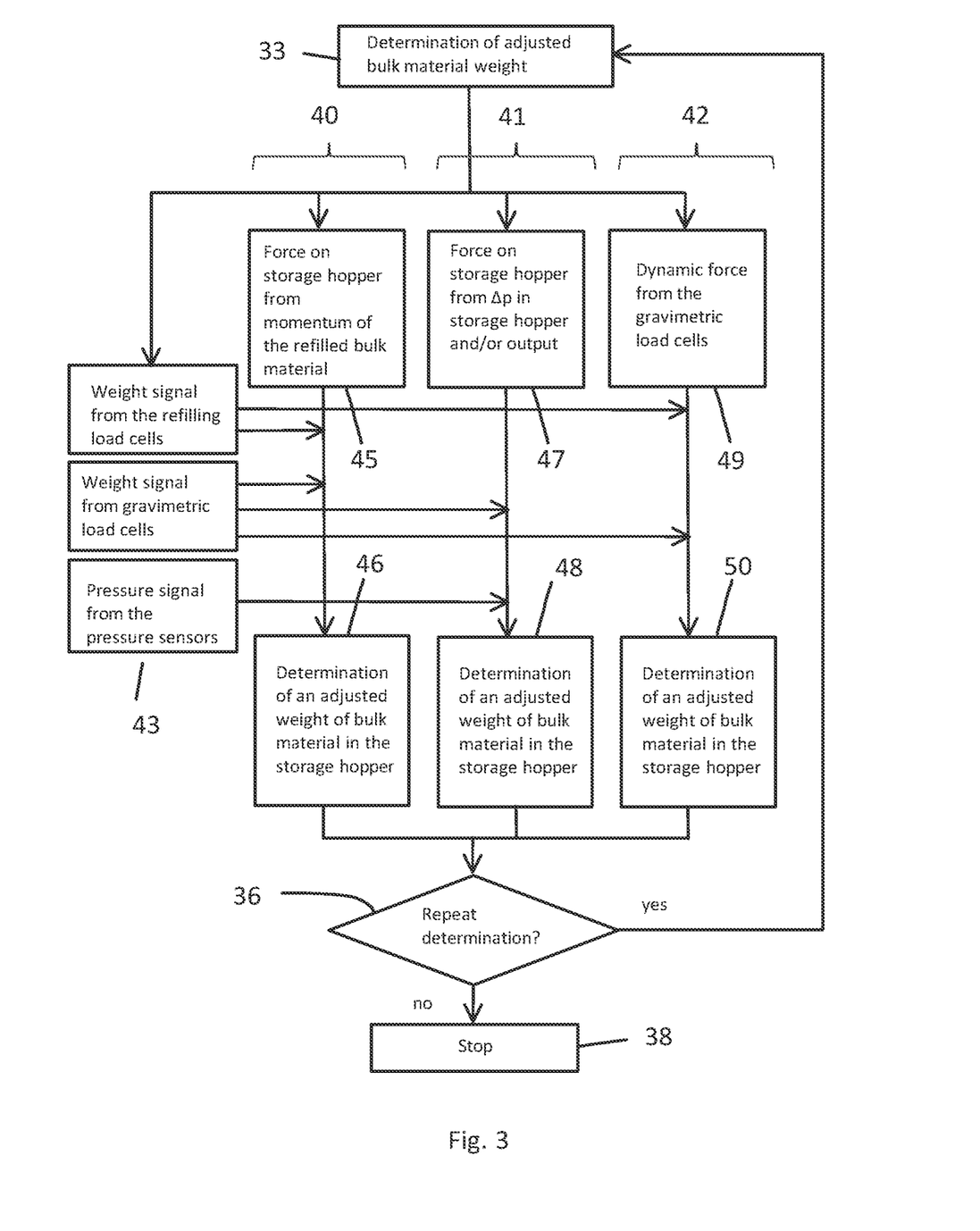
FIG. 3 shows a flowchart for calculating an adjusted weight of the bulk material in the storage hopper of the metered dispensing unit of FIG. 1.

FIG. 3 shows a flowchart for determining a bulk material weight in the storage hopper with disturbances accounted for, i.e. for step 33 of FIG. 2. This further affords the capability to at least reduce or substantially eliminate the effect of the abovementioned disturbances on the mass flow discharged by the metered dispensing unit by means of a correction factor, which represents a regulating variable for the volumetric control model. As a result, the increase in bulk material weight in the storage hopper is calculated during refilling using a bulk material weight from which the disturbances have been removed.

FIG. 3 illustrates three branches 40 to 42 in which the controller 10 of the metered quantity dispenser 1 (FIG. 1) carries out an adjustment—independently of the other branches 40 to 42 in each case—of the weight of the bulk material present in the storage hopper 4 as detected by the gravimetric load cells 11 (FIG. 1), which weight is however distorted by a specific disturbance.

Each branch 40 to 42 begins with step 30 as soon as the controller 10 initiates the refill operation, and ends with step 38, i.e. as soon as the storage hopper 4 is filled up. In each branch, according to step 43 the weight signal of the gravimetric load cells 11 is collected by the controller 10 during refilling and used to determine the weight with disturbances eliminated.

In branch 40, the force generated by the momentum of the refilling bulk material and acting on the storage hopper which is detected as weight by the gravimetric load cells 11 is determined in step 45. For this purpose, the geometry of the refilling duct 7 and the storage hopper 4 and thus also the drop height for the bulk material may be stored in the controller 10. The controller 10 can determine the decreasing weight of the refilling container 3 and on that basis the mass flow of the bulk material falling into the storage hopper 4 from the signals of the refill load cells 14. The drop height and the mass flow may be used to determine the momentum (or momentum stream) and from this in turn the force acting on the gravimetric load cells 11 due to said momentum over time, which force generates the required component of the weight detected by the gravimetric load cells 11. In step 46 this force is subtracted from the detected weight and saved in the controller as a weight from which the factor of momentum has been eliminated. As a result, the bulk material weight is calculated from the force exerted on the storage hopper adjusted by the moment of the falling bulk material preferably during refilling, and that the controller of the gravimetric metered dispensing unit is preferably designed to determine a bulk material weight in the storage hopper adjusted by the momentum of the bulk material falling into the storage hopper. It should be noted that the signals from the refill load cells 14 may display a slight pulsation, caused for example by a refill screw conveyor. This pulsation is smoothed out by the free fall of the added powder. A corresponding equalisation (possibly calculated experimentally) may then be assumed in real time in the controller 10, so that the quantity of bulk material actually supplied to the storage hopper is captured very precisely.

In branch 41 the current overpressure in the storage hopper 4 is captured in step 47, and from this the controller 10 in step 47 uses the geometry of the storage hopper 4 and of the refilling duct 7 stored in it to determine the force to which the load cells 11 are exposed due to the overpressure. In step 48, this force is subtracted from the detected weight and saved in the controller as a weight from which the factor of overpressure has been eliminated. This is preferably carried out in the same way for the weight with overpressure eliminated in the output line. Consequently, the adjusted bulk material weight is calculated using a pressure currently prevailing in the storage hopper.

This preferably creates a gravimetric metered dispensing unit in which the storage hopper and/or a discharge outlet for bulk material arranged behind the output conveyor is equipped with a pressure sensor that is designed to generate a signal for a pressure fluctuation while the storage hopper is being refilled, and wherein the controller is further designed to determine a value for the weight of the bulk material currently present in the storage hopper which has been adjusted to account for the pressure fluctuation from the signal for the pressure fluctuation and the signal from the load cell.

In branch 42 in the step the dynamic behaviour of the gravimetric load cells 11 is captured with regard to the weight detected by them. Since the momentum generated by the refilled material is caused to vibrate by the spring rigidity of the load cells 11 (a single or several gravimetric load cells may be involved, depending on the construction of the metered dispensing unit 1), the shock absorption of the weighing system and the total weighed mass (weighed part of the load cell, the metered dispensing unit, the bulk material and the force exerted on the load cell by the momentum), a virtual force is generated from the dynamic behaviour of the oscillating load cell, which constitutes a further disturbance, distorting the detected weight of the bulk material in the storage hopper 4.

The force generated by the momentum may be calculated according to step 45 in branch 40. The mass of the weighing part of the load cells 11, the damping of the weighing system and its spring rigidity are parameters that the person skilled in the art can determine for each specific case, since either the load cells 11 are known or these parameters can be determined using a calibration function, or because the behaviour of the load cell can simply be determined experimentally on the basis of a refill. With these parameters, the person skilled in the art can calculate the oscillation and the resulting virtual force of the load cells 11 during refilling, and store them in the controller 10. The current weight signal is then adjusted to eliminate the virtual force and stored in the controller 10 as the weight which has been adjusted to compensate for the dynamic behaviour of the load cell in accordance with step 50. Accordingly, the adjusted bulk material weight is calculated with the aid of the vibration characteristics of the at least one gravimetric load cell, wherein the controller of a gravimetric metered dispensing unit is more preferably designed to determine a bulk material weight in the storage hopper that has been adjusted to eliminate a virtual force from the dynamic behaviour of the at least one gravimetric load cell which is oscillating due to the momentum of the bulk material falling into the storage hopper.

It should be noted here that the influence of the dynamic behaviour of the load cell depends mainly on its spring rigidity—depending on the properties of the replenishing material and the resonance frequency of the gravimetric load cells the person skilled in the art does not need to determine the weight adjusted to eliminate the dynamic behaviour in certain cases, for example if very rigid load cells with high resonance frequency are involved and the material swirls during refilling, generating a low-impact momentum. At this point, it should also be pointed out that of course the disturbances illustrated in branches 40 and 41 and the disturbances according to all of the branches 40 to 42 may be captured at the same time and an adjusted weight of the bulk material in the storage hopper may be calculated directly from the results of steps 45,47 and optionally step 49.

Figure 4:
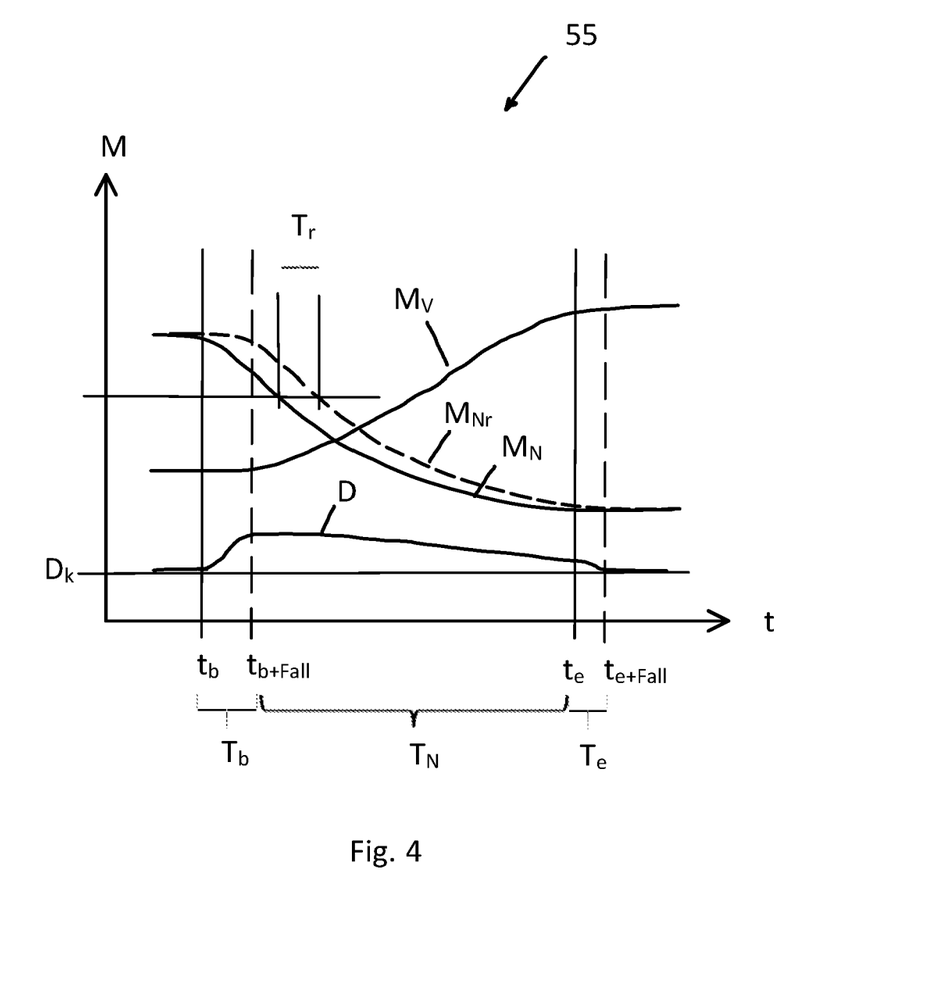
FIG. 4 shows a diagram for determining the time offset for the weight increased in the storage hopper of the metered dispensing unit of FIG. 1.

FIG. 4 shows a diagram 55 of the distribution of the bulk material between refilling container 3 and the storage hopper 4 during refilling. Time is plotted on the horizontal axis, wherein $t_b$ marks the beginning and $t_e$ marks the end of the refilling operation. The mass M of bulk material is plotted on the horizontal axis.

Curve $M_N$ describes the mass of bulk material in the refilling container 3, it corresponds to the weight detected by the refilling load cells 14. Curve $M_V$ describes the mass of bulk material in the storage hopper 4, it corresponds to the true weight thereof.

When refilling is initiated at time $t_b$, the mass in the refilling container decreases immediately, because the bulk material falls through the connecting duct 7. However, the mass in the storage hopper does not change during the time the bulk material takes to fall, it does not begin to increase until time $t_{b+Fall}$, that is to say then the falling bulk material has reached the lower fill level of the storage hopper. Then, the mass in the storage hopper continues increasing briefly after the end of the refilling operation at time $t_e$, specifically until time $t_{e+Fall}$. In this context, the second time interval $t_e = t_e - t_{e+Fall}$ is smaller than the first time interval $t_b = t_b - t_{b+Fall}$, because the drop height to the upper fill level is smaller after the refilling operation.

Curve D describes the difference between the masses in the refilling container 3 and in the storage hopper 4, that is to say $M_N - M_V$. Since this is a simple exchange of masses between these containers, this difference should be substantially constant and have value $D_K$. Thus the jump in curve D in the first time interval $T_b$ to a value greater than $D_K$ shows that a bulk material mass is in freefall, just as in section $T_N$ and during the jump in time interval $T_e$.

In step 34 of FIG. 2, the controller 10 determines the actual mass flow discharged by the metered dispensing unit during refilling by generating the difference between the weight of the bulk material discharged from the refilling container 3 and the weight of the bulk material adjusted to eliminate disturbances in the storage hopper 3, which is based on the weight detected by the gravimetric load cells 11. According to the diagram 55, the determined actual mass flow in determined in time interval $T_b + T_N + T_e = T_{e+Fall} - t_b$ contains a systematic error $F = D - D_k$. This results in a calculation of the actual mass flow that is too large by the incorrect mass flow F deduced according to the time, which returns a correspondingly incorrect correction factor. This error may be taken into account in specific cases—preferably, however, the person skilled in the art will modify the algorithm in step 34 of FIG. 2 in such a way that the values for the mass discharged by the refilling container 3 (curve $M_N$) are shifted to the right by a time $T_r$ in the time interval $T_b$, see curve $M_{Nr}$, with the consequence that the systematic error F is reduced or disappears. The time $T_b$ is available from the detected weight pf the refilling load cells 14 and the detected weight of the gravimetric load cells 11 (rapid rise in the weight due to the momentum) or can simply be deduced from the drop height according to the geometry used in a given case. The same applies to time $T_e$.

Consequently, the weight of the refilling bulk material as the reduction of the weight in the refilling container and the increase in the weight of the bulk material in the storage hopper registered by the at least one gravimetric load cell are processed simultaneously or with a time offset for the calculation of the actual bulk material flow, wherein the time offset preferably corresponds approximately to a fall time of the bulk material from the refilling container into the storage hopper.

Figure 5:
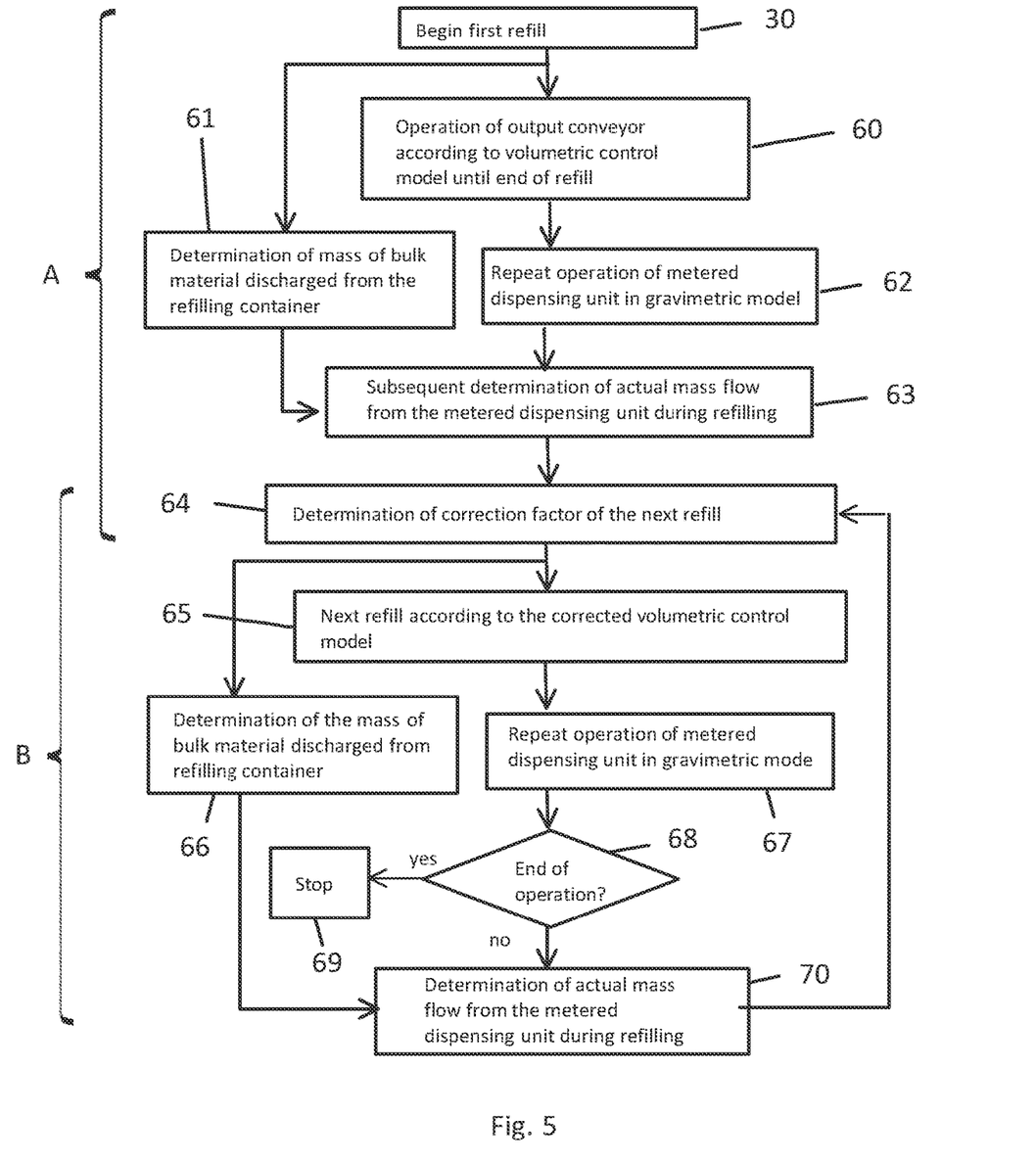
FIG. 5 shows a flowchart for a further embodiment of the control of the mass flow discharged during refilling from the metered dispensing unit of FIG. 1.

FIG. 5 shows a flowchart for a further embodiment of the present invention. In a first section A, the metered dispensing unit 1 (FIG. 1) is operated conventionally according to a volumetric control model for a first refilling operation (step 30) and then a first correction factor is determined for the volumetric control model. In section B, in the case of for materials whose refilling properties can be reproduced well the correction factor is improved progressively on the basis of preceding refilling operations until the average of the actual mass flow discharged during refilling approximates or is substantially equal to the target mass flow.

In step 30 (section A) the first refilling operation begins, and according to step 60 proceeds only with a volumetric control model. However, in step 61 according to the invention the mass of the refilling bulk material is determined with the aid of the refilling load cells 14 and stored in the controller 10. After refilling, the controller 10 switches the metered dispensing unit 1 back into gravimetric mode, see step 62.

As soon as the load cell has become steady, the average discharged during refilling is determined in accordance with step 63: the discharged actual gravimetric mass flow can now be determined reliably in gravimetric mode, as can the true current weight of the bulk material in the storage hopper 4. The true mass of the bulk material discharged during refilling follows from the difference between the refilled bulk material and the true weight at the beginning of the gravimetric mode, with the refilling time the average actual refilling mass flow during refilling. Since the conditions during the gravimetric operating mode are known (actual mass flow), the average actual refilling mass flow can be calculated by the controller 10 before the next refilling operation. As a result, the actual mass flow discharged during refilling is again available according to the invention, admittedly only as an average value during the refilling, but nevertheless as a quantitative value, which in given circumstances may already be sufficient to satisfy the quality assurance requirements on a production line.

In step 64 the controller calculates a correction factor for the volumetric control model from the difference between the target mass flow and the average actual refilling mass flow.

In section B, the cycle is repeated, but with the difference that according to step 65 the volumetric control model corrected by the correction factor is applied during refilling. After the metered dispensing unit 1 has been operated in gravimetric mode again (step 67) the system queries whether operation is to be continued (step 68), if the response is no it is stopped in step 69, if the response is yes the actual refilling mass flow is determined again in step 70.

Accordingly, the actual bulk material flow and/or the correction factor is/are determined after one refilling operation but before the next refilling operation, and in the case of the correction factor applied to the volumetric control model and for a subsequent refilling operation, wherein the correction factor is preferably recalculated on the basis of a preceding correction factor over the course of multiple refilling operations, wherein the controller of the gravimetric metered dispensing unit is further preferably designed to determine a value for the weight of the totality of the bulk material refilled during a refilling operation from the signals of the sensor for the refill quantity and to determine an actual bulk material flow and/or a correction factor from a weight signal of the at least one gravimetric load cell while the storage hopper is being emptied after it has been refilled, and in the case of the determined correction factor to apply this to the volumetric control model for a following refilling operation.

According to the invention, further disturbances such as the additional compaction or fluidisation of the bulk material in the storage hopper caused by the momentum may be detected and compensated for. If additional compaction occurs, the actual mass flow becomes too large, if fluidisation occurs, the actual mass flow becomes too small. Both cases are detected in step 34 of FIG. 2 and the mass flow is adjusted appropriately in real time according to step 35. The same applies with regard to the average actual discharged mass flow in accordance with steps 63, 64 and 70 of FIG. 5.

This applies in the same way for the case in which the momentum causes the bulk material to be driven through the output conveyor so that the actual mass flow shows a short-duration undesirable spike. The person skilled in the art can be then instruct the controller such that it recognises a pronounced spike, regulates the mass flow in real time or correspondingly on average and also captures the time and magnitude of the spike and stores it. The volumetric control model may then contain a default change besides the correction factor which adjusts the actual mass flow downwards by a predefined amount at the preset point in time. Disturbances due to bridge formation are also captured and corrected according to the invention while the bridges are being formed, as well as while the bridges are collapsing, wherein the collapse gives rise to a momentum similar to the momentum from the refilled material.

In FIG. 1, the mass of bulk material discharged from the refilling container 3 into the storage hopper 4 during refilling is detected via one or more refilling load cells 14, wherein the refilling load cell 14 function as sensors for a parameter for the discharged refilling quantity. The fill level of the refilling container 3 may also serve this purpose instead of refilling load cells 14, and may be captured by means of fill level sensors, providing a compaction of the bulk material in the refilling container is known, from experimentation for example. The person skilled in the art may also provide rotary valves instead of a slider 15 (FIG. 1) to achieve rapid but still metered discharge of the bulk material into storage hopper 4. Finally, it is conceivable to provide a cascade of metered dispensing units, wherein a refilling metered dispensing unit may be constructed exactly as represented in FIG. 1, but then also has a relatively large displacement capacity. Then, the feed output of the rotary valve or the refilling metered dispensing unit etc. represents a parameter for the discharged refill quantity, which may be processed by the controller in similar manner to the weight signal from the refilling load cells 14.

The invention claimed is:

1. A method for determining a mass flow of a metered dispensing unit for bulk materials, including a storage hopper and a refilling station with a refilling container connected thereto, wherein the metered dispensing unit is equipped with at least one gravimetric load cell for gravimetric metered discharge via an output conveyor, and the refilling container periodically replenishes the storage hopper with bulk material from a lower fill level to a filled state, and is furnished with a sensor for a parameter of a discharged refill quantity, and wherein the output conveyor is actuated by a volumetric control model during refilling, and wherein the output conveyor is actuated by a continuous graphimetric closed loop control when there is no refilling, wherein a weight of the bulk material added to the storage hopper during refilling thereof is determined from data from the sensor for the refill quantity output from the refilling station and an increase in the weight of the bulk material in the storage hopper during refilling of the storage hopper is determined, and an actual bulk material flow discharged during refilling is calculated from a difference between these weights.

2. The method according to claim 1, wherein further a correction factor for the volumetric control model is generated from the difference between a target bulk material flow and the actual bulk material flow and applied to the control model to regulate the mass flow.

3. The method according to claim 2, wherein the actual bulk material flow is determined and/or the correction factor is generated repeatedly during refilling, and wherein the correction factor determined in each case is applied to the volumetric control model in real time.

4. The method according to claim 3, wherein the weight of the refilled bulk material as a reduction of the weight of the refilling container and the increase in the weight of the bulk material in the storage hopper registered by the at least one gravimetric load cell are processed simultaneously or with a time offset in order to calculate the actual bulk material flow, wherein the time offset is at least approximately equal to a time the bulk material takes to fall from the refilling container into the storage hopper.

5. The method according to claim 3, wherein the increase of the weight of the bulk material in the storage hopper during refilling is calculated on the basis of a bulk material weight which has been adjusted to account for disturbances.

6. The method according to claim 5, wherein the adjusted bulk material weight is calculated with the aid of a current pressure prevailing in the storage hopper.

7. The method according to claim 5, wherein the adjusted bulk material weight is calculated with the aid of a current pressure prevailing in a discharge outlet.

8. The method according to claim 5, wherein the adjusted bulk material weight is calculated during refilling using a force exerted on the storage hopper via a momentum of falling bulk material.

9. The method according to claim 5, wherein the adjusted bulk material weight is calculated using vibration characteristics of the at least one gravimetric load cell.

10. The method according to claim 2, wherein the actual bulk material flow and/or the correction factor is determined and applied to the volumetric control model for a subsequent refill after refilling but before the subsequent refill, wherein the correction factor is determined again over the course of several refilling operations based on a preceding correction factor.

11. The method according to claim 1, wherein the volumetric control model controls the mass flow generated by the output conveyor via a predetermined value for a target mass flow.

12. The method according to claim 1, wherein the volumetric control model also controls the mass flow generated by the output conveyor with data on the compaction of the bulk material while the storage hopper is being emptied.

13. A gravimetric metered dispensing unit for bulk material, with a storage hopper for the bulk material to be dispensed in metered quantities and a refilling station connected therewith which is designed to replenish a refill quantity of the bulk material in the storage hopper, and is equipped with a sensor for a parameter for the refill quantity, with at least one gravimetric load cell which is connected in operative manner to the storage hopper and an output conveyor for the bulk material for continuously closed loop controlled gravimetric metered dispensing of the bulk material, and with a controller for the output conveyor which is designed to actuate said conveyor according to continuous closed loop controlled gravimetric dispensing during a non-refilling phase and which is designed to actuate said conveyor according to a volumetric control model during a refilling phase, wherein the controller is further designed to determine during the refilling a weight of the bulk material discharged from the refilling station from signals of the sensor on the refill quantity, and to further determine a value for the weight of the bulk material currently present in the storage hopper from a weight signal of the at least one gravimetric load cell, and from these to determine an actual bulk material flow discharged from the metered dispensing unit during the refilling operation.

14. The gravimetric metered dispensing unit according to claim 13, wherein the controller is further designed to determine a correction factor for the volumetric control model from a difference between a target bulk material flow and the actual bulk material flow and apply it to the control model.

15. The gravimetric metered dispensing unit according to claim 13, wherein the sensor for the parameter of the refill quantity is embodied as a weight sensor.

16. The gravimetric metered dispensing unit according to claim 13, wherein the storage hopper and/or a discharge outlet for the bulk material arranged after the output conveyor is furnished with a pressure sensor which is designed to generate a signal for a pressure fluctuation during refilling of the storage hopper, and wherein the controller is further designed to determine a value for the weight of the bulk material currently present in the storage hopper that is adjusted by the pressure fluctuation from the signal for the pressure fluctuation and the signal of the at least one gravimetric load cell.

17. The gravimetric metered dispensing unit according to claim 13, wherein the controller is designed to determine a bulk material weight in the storage hopper that is adjusted by a momentum of the bulk material falling into the storage hopper.

18. The gravimetric metered dispensing unit according to claim 13, wherein the controller is designed to determine a bulk material weight in the storage hopper that is adjusted by a virtual force from the dynamic behaviour of the at least one gravimetric load cell vibrating under a momentum of the bulk material falling into the storage hopper.

19. The gravimetric metered dispensing unit according to claim 14, wherein the controller is further designed to determine the actual bulk material flow and/or the correction factor multiple times during refilling and in the case of the determined correction factor to apply it to the volumetric control model in real time, in such manner that the value thereof is adapted for the target bulk material flow during refilling.

20. The gravimetric metered dispensing unit according to claim 13, wherein the controller is designed to determine a value for the total weight of the refilling bulk material during a refilling operation from the signals of the sensor for the parameter on the discharged refill quantity, and to determine the actual bulk material flow and/or a correction factor from a weight signal of the at least one gravimetric load cell while the storage hopper is being emptied subsequently to the refilling operation, and in the case of the determined correction factor to apply this to the volumetric control model for a subsequent refilling operation.

* * * * *